3,708,585
METHOD OF ENHANCING LEARNING
Nicholas Peter Plotnikoff, Lake Bluff, Ill., assignor to Abbott Laboratories, North Chicago, Ill.
No Drawing. Continuation-in-part of abandoned application Ser. No. 85,311, Oct. 29, 1970. This application Feb. 10, 1972, Ser. No. 226,240
Int. Cl. A61k 27/00
U.S. Cl. 424—251         8 Claims

ABSTRACT OF THE DISCLOSURE

Covers a pharmaceutical composition containing uracil, thymine, or cytosine which has an enhancing effect in learning rate and retention level of animals. Also covers a method of their use.

REFERENCES TO RELATED APPLICATIONS

This application is a continuation-in-part of my co-pending application bearing the Ser. No. 85,311, filed Oct. 29, 1970, now abandoned.

SUMMARY OF THE INVENTION

This invention comprises pharmaceutical compositions containing as one ingredient, uracil, thymine, or cytosine along with a pharmaceutically acceptable carrier. Said compositions are useful in enhancing the learning rate and retention level in normal animals and also those who suffer an impairment in this area. Upon administration of a composition of the present invention, one realizes an enhancement of acquisition and retention of a learned response.

The overall effect resulting from the administration of the compositions of the present invention results in the acquisition and retention of a conditioned avoidance response by the animals. A markedly shortened escape time was found to result with respect to both, an acquisition test and retention trials, in rats treated with uracil, thymine, or cytosine. Pretreatment of the rats during the training trials resulted in markedly prolonged retention of learned performance, up to six months following drug administration. In comparable studies with a number of known central nervous system stimulants or antidepressants, no significant increase in acquisition rate or retention level of avoidance response was noted compared to saline-treated animals. This was true with respect to D-desoxyephedrine hydrochloride and methyl-α-phenyl-α-(2-piperidyl)acetate which are known central nervous system stimulants or antidepressants.

The behavioral test system is described in Science, 151, pp. 703–704 (1966). In brief, the system employed in evaluating the compositions of the present invention consisted of a wood chamber with a grid flooring and an escape platform outside of the chamber placed 30 cm. above the grid flooring. An electric shock to the grid flooring was controlled by a rheostat mechanism and scrambler. With reference to the following examples, a heterogenous colony of rats was first selected and the drug tested was administered intraperitoneally. Thirty minutes after administration of the drug, the animals were given an electro-convulsive shock. This shock, through cornea electrodes, produced maximal seizures consisting of a complete tonic extensor response. The behavioral studies were started 15 minutes after administration of the electro-convulsive shock.

The behavioral effects resulting from administration of the noted compositions to rats were evaluated employing the previously described apparatus. Each acquisition trial consisted of 15 seconds in the chamber without any stimulation, followed by 10 seconds of buzzer stimulation and culminated by 5 seconds of buzzer/plus/shock stimulation. The time for entrance into the chamber until the rat jumped out was recorded as the "escape time." Retention trials were conducted one hour, two hours, four hours, and twenty-four hours after the last acquisition trial by testing the animals escape responses in the test chamber during a 30-second time period without stimulation of any kind. With respect to the acquisition trial, the criterion of successful learning was a mean escape time of 15 seconds or less.

The following examples illustrate the efficacy of the invention by demonstrating the effectiveness of the compounds herein enhancing learning and memory.

Example I relates to the administration of uracil or 2,6-dioxypyrimidine to rats to enhance learning and memory while Example II relates to the use of thymine or 5-methyl uracil. Example III is concerned with administration of cytosine or 4-amino-2-pyrimidone.

EXAMPLE I
[Mean jump time in seconds±S.E.]

|  | Controls | Uracil, 10 mg./kg. | Controls | Uracil, 20 mg./kg. |
|---|---|---|---|---|
| Trial No. acquisition: |  |  |  |  |
| 1 | 29.8±0.3 | 29.5±0.5 | 29.8±0.3 | 28.8±0.8 |
| 2 | 28.5±0.6 | 29.5±0.5 | 29.0±0.7 | 29.3±0.8 |
| 3 | 25.0±2.8 | 28.3±0.6 | 26.5±3.5 | 19.5±4.1 |
| 4 | 18.5±3.7 | 22.8±2.6 | 24.0±2.8 | 11.3±1.7 |
| 5 | 20.5±4.7 | 19.8±5.3 | 23.0±1.2 | 13.8±1.9 |
| 6 | 25.0±2.3 | 11.5±4.9 | 25.0±2.8 | 10.8±1.9 |
| 7 | 20.0±5.1 | 8.8±3.5 | 21.8±2.8 | 9.3±2.7 |
| 8 | 19.3±5.1 | 10.5±3.2 | 22.8±3.4 | 11.3±1.7 |
| 9 | 15.0±1.1 | 11.8±5.1 | 17.8±3.0 | 8.8±1.2 |
| 10 | 17.8±5.2 | 10.3±3.3 | 16.5±3.0 | 10.3±0.8 |

EXAMPLE II
[Mean jump time in seconds±S.E.]

|  | Controls | Thymine, 20 mg./kg. | Thymine, 40 mg./kg. |
|---|---|---|---|
| Trial No. acquisition: |  |  |  |
| 1 | 30.0±0.0 | 27.5±0.3 | 30.0±0.0 |
| 2 | 30.0±0.0 | 27.3±0.6 | 29.5±0.5 |
| 3 | 29.5±0.5 | 26.5±0.5 | 19.7±3.4 |
| 4 | 28.5±0.9 | 25.0±1.4 | 14.0±4.1 |
| 5 | 25.0±2.3 | 17.3±2.1 | 7.0±2.8 |
| 6 | 16.0±1.6 | 8.3±2.6 | 5.2±2.3 |
| 7 | 14.2±1.9 | 10.0±2.3 | 5.0±1.7 |
| 8 | 17.0±0.9 | 8.8±2.8 | 5.5±2.3 |
| 9 | 14.0±0.9 | 10.3±4.3 | 6.2±3.6 |
| 10 | 14.2±1.5 | 11.3±5.2 | 8.7±3.1 |
| Retention: |  |  |  |
| 1 hour | 20.2±4.2 |  | 7.0±3.4 |
| 2 hours | 20.2±3.5 |  | 9.0±3.0 |
| 4 hours | 22.7±4.5 |  | 9.2±3.4 |
| 24 hours | 20.2±4.0 |  | 10.0±3.6 |

EXAMPLE III

[Mean jump time in seconds ± S.E.]

|  | Controls | Cytosine, 5 mg./kg. | Cytosine, 10 mg./kg. | Cytosine, 20 mg./kg. | Cytosine, 40 mg./kg |
|---|---|---|---|---|---|
| Trial No. acquisition: | | | | | |
| 1 | 30.0±0.0 | 30.0±0.0 | 30.0±0.0 | 30.0±0.0 | 30.0±0.0 |
| 2 | 22.5±4.1 | 23.7±0.2 | 23.0±4.3 | 28.2±0.6 | 25.2±4.1 |
| 3 | 22.5±3.2 | 10.0±5.6 | 20.5±1.0 | 13.2±3.4 | 9.0±1.7 |
| 4 | 19.2±3.3 | 8.7±1.8 | 10.2±2.8 | 7.2±3.3 | 10.7±4.4 |
| 5 | 20.2±3.3 | 19.2±1.1 | 14.0±4.9 | 10.0±3.8 | 15.0±4.3 |
| 6 | 21.7±3.0 | 7.2±3.1 | 13.0±0.6 | 8.2±3.4 | 12.0±5.0 |
| 7 | 25.7±0.6 | 5.7±0.4 | 13.2±1.3 | 6.5±1.0 | 10.7±5.1 |
| 8 | 24.2±2.0 | 5.2±2.3 | 10.2±1.5 | 8.0±3.7 | 9.5±2.9 |
| 9 | 20.7±3.4 | 6.0±0.4 | 11.7±1.0 | 10.0±4.6 | 12.7±2.1 |
| 10 | 15.7±1.0 | 6.7±0.2 | 11.5±0.8 | 6.0±1.5 | 9.0±1.2 |
| Retention: | | | | | |
| 1 hour | 25.2±4.7 | 7.5±1.8 | 15.0±5.4 | 8.2±2.2 | 12.5±1.3 |
| 2 hours | 25.5±4.5 | 7.5±3.2 | 21.7±5.7 | 12.7±5.9 | 17.0±5.0 |
| 4 hours | 25.7±3.2 | 7.5±2.9 | 23.0±4.1 | 17.7±7.1 | 16.7±5.1 |
| 24 hours | 28.2±1.7 | 9.0±1.6 | 7.2±1.8 | 10.2±3.4 | 8.0±0.7 |

From the foregoing studies, it is apparent that the above disclosed compounds effectively enhance the learning rate and retention levels in animals. Since it is known that memory of learned events in animals can be severely disrupted and blocked by electro-convulsive shock (Deutsch, J. A., 1962 Ann. Rev. Psychol., 24, p. 259), these studies also illustrate the effectiveness of the present invention in facilitating learning and retention in impaired animals.

The compositions here may be administered by dispersing them in a liquid character or by providing the active composition in the form of granulation tablets, capsules, elixirs, emulsions, and other dosage forms well known in the art. The administration may include oral administration or any other means of administration such as injection, intraperitoneal, intramuscular; or if desired the active ingredients can be incorporated in an oil or wax base and administered as an oral suppository.

The compounds of this invention have been found to be effective in test animals here at a dosage range greater than 5–10 mg./kg. of body weight daily and are effective to varying degrees at any amount above this figure. As a practical matter the dosage range for larger warm-blooded animals and particularly humans is 0.5–100 mg./kg. per day. More often the dosage for humans is 1–50 mg./kg. per day. In any event, it is desirable that the described compositions be administered at a dosage level sufficiently effective to enhance learning rate and retention period in warm-blooded animals.

I claim:

1. A method of enhancing learning rate and retention level impairment in warm-blooded animals which comprises administering to a warm-blooded animal having said impairment at least an effective amount of a compound selected from the group consisting of uracil, thymine and cytosine.

2. The method of claim 1 wherein said compound is uracil.

3. The method of claim 1 wherein said compound is thymine.

4. The method of claim 1 wherein said compound is cytosine.

5. A method of enhancing learning rate and retention level in warm-blooded animals which comprises administering to a warm-blooded animal at least an effective amount of a compound selected from the group consisting of uracil, thymine, and cytosine.

6. The method of claim 5 wherein said compound is uracil.

7. The method of claim 5 wherein said compound is thymine.

8. The method of claim 5 wherein said compound is cytosine.

References Cited

Merck Index, 7th Ed. (1960), pp. 318, 1045–1080.

STANLEY J. FRIEDMAN, Primary Examiner